Patented Aug. 23, 1927.

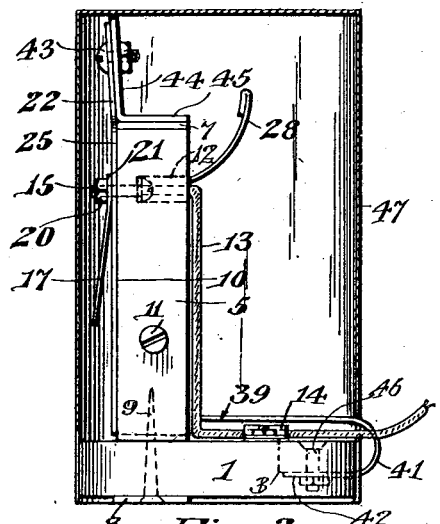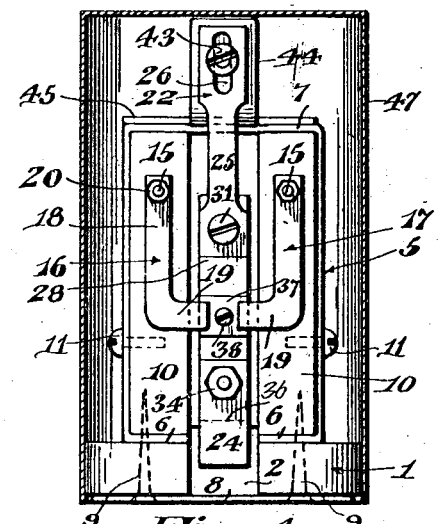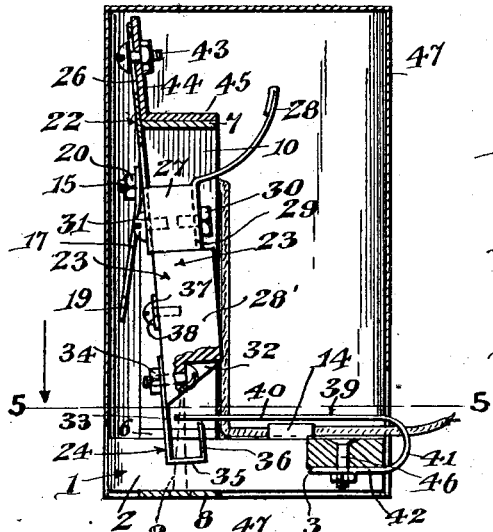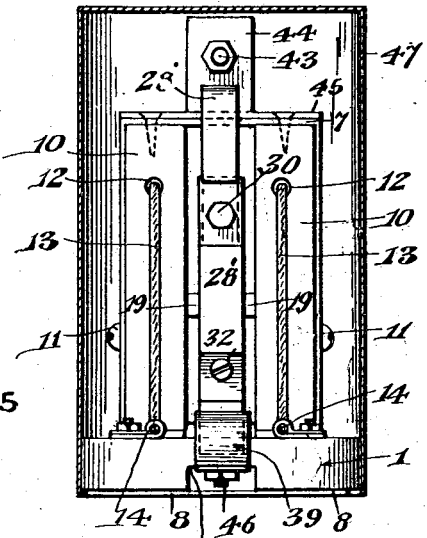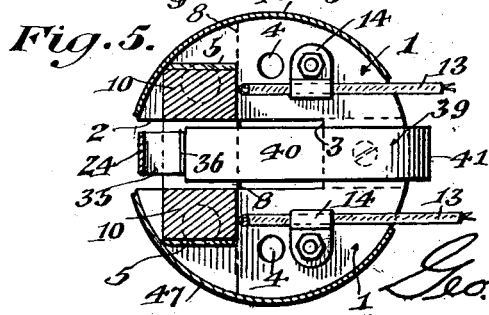

1,640,300

UNITED STATES PATENT OFFICE.

PETER STRUGHOLD, OF ST. LOUIS, MISSOURI.

THERMOSTATIC SAFETY SWITCH OR CUT-OUT.

Application filed September 14, 1926. Serial No. 135,343.

This invention relates to a thermostatic controlled safety switch or cut-out designed primarily for use for the protection of A. C. motors, but it is to be understood that a device, in accordance with this invention, can be employed in any connection for which it is found applicable, and the invention has for its object to provide a safety switch or cut-out, hereinafter termed a thermostatic switch, for not only obtaining a greater protection for the motor during the operation thereof, as when relays are used in connection therewith, but further for overcoming the several objections present in the use of relays for protective purposes.

Amongst the objections present in the use of relays for protective purposes with respect to a motor is that when a motor is running with half its load and the rotor is rubbing the stator slightly, it is not drawing enough current through the relay to cut it out and then the winding is destroyed by excessive temperature; when a motor is operating in a dusty place the oil in the dash pot of the relay gums up and prevents the working of the relay; when some temporary jobs are installed with a relay, sometimes there are fifteen or twenty horse power relays used on ten horse power motors, then the relay is no protection to the motor at all; when a three phase motor is running single phase and fused too heavy and the relay dash pot or coil is out of order there is no protection for the motor; when a motor is running with low bearings, the rotor is out of center in the stator and is not drawing enough current through the relay or through the fuses to blow to protect the motor and when a motor is running in a place were there is poor ventilation there is no protection for the windings and the bearings from the relay or the fuses. The foregoing objections are overcome by a thermostatic controlled safety switch or cut-out in accordance with this invention.

Further objects of the invention are to provide a thermostatic controlled safety switch or cut-out, in a manner as hereinafter set forth, and which is simple in its construction and arrangement, strong, durable, compact, thoroughly efficient in its use, conveniently installed and reset, and inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a side elevation of a thermostatic switch in accordance with this invention, and illustrating the same enclosed in a casing, the latter being shown in vertical section.

Figure 2 is a front elevation of a thermostatic switch in accordance with this invention, and with the switch closed, and with the switch arranged within a casing, the latter being illustrated in vertical section.

Figure 3 is a vertical sectional view of a switch in accordance with this invention, showing the same arranged in a casing, and further illustrating the switch in open position.

Figure 4 is a rear elevation of the switch, showing the same within a casing and with the latter illustrated in vertical section.

Figure 5 is a section on line 5—5 Figure 3 and with the switch illustrated in closed position.

Referring to the drawings in detail 1 generally indicates a base of insulation formed with a diametrically disposed cut-out portion 2 of rectangular contour, and of a length less than the diameter of the base 1. The said cut-out portion extends from the edge of the base 1 and terminates adjacent the axis thereof. The length of the cut-out portion 2 is greater than half the diameter of the base 1. The base 1 is of circular contour. The lower face of the base 1 is provided with a diametrically disposed groove 3 which opens into the cut-out portion 2 and at that side of the edge opposite the side at which is positioned the open end of the cut-out portion 2. The base 1 is formed with a pair of spaced alining openings 4 for the passage of hold-fast devices to fixedly secure it in position with respect to the motor.

Positioned on the base 1 is a vertically disposed, inverted yoke-shaped metallic strap 5, having each of its arms at the lower end thereof formed with an inturned flange 6 which seats on the upper face of the base. The flanges on the arms of the member 5 are oppositely disposed with respect to each other and flush with the side walls of the cut-out portion 2. The top 7 of the member 5 is arranged in superposed relation with respect to the cut-out portion 2 and extends transversely with respect thereto. Secured to the lower face of the base 1 and extending transversely with respect to the cut-out portion 2, is a reinforcing strip 8. The strip 8 is fixedly secured to the lower face of the base 1 by vertically extending hold fast devices 9, which extend through the flanges 6' and engage in a pair of vertically extending short bars 10 formed of insulation or non-conducting material. The bars 10 extend from the flanges 6 to the top 7 of the member 5 and have their inner sides flush with the side walls of the cut-out portion 2. The bars 10 are arranged in spaced relation and are secured to the sides of the member 5, by the hold fast devices 11. Each bar 10 at a point between its transverse median and its upper end is formed with an opening 12 which extends from the front to the rear of its respective bar. The openings 12 are provided for the passage of the circuit conductors 13. The circuit conductors 13 are arranged at the rear of the bars 10 and are connected to the upper face of the base 1, by the retaining devices 14. The circuit conductors 13 project rearwardly from the base 1 and are arranged at each side of the cut-out portion 2. That is to say the circuit conductors 13 are spaced from each side of the cut-out portion 2. Each conductor 13 includes a terminal connection 15 which is threaded and projects from the forward face of a bar 10.

Positioned against the forward faces or front of the bars 10, as well as extending therefrom at a downward and outward inclination with respect thereto is a pair of oppositely disposed angle-shaped contact members 16, 17 and each consists of an upstanding arm 18 and a horizontally disposed arm 19 which extends at right angles to and inwardly with respect to the lower end of the arm 18. The upper end of the arm 18 is mounted on a terminal 15 and is fixedly secured in position by a securing nut 20. The upper end of the arm 18 is indicated at 21 and is maintained against a bar 10 by the nut 20. That part of each of the contact members, below the part 21, projects away from the bars 10. The horizontal arms 19 of the contact members extend towards each other, but are arranged in spaced relation, and furthermore, they are positioned to oppose the space formed between the bars 10. The contact members co-act with an element, to be presently referred to, for the purpose of normally closing the motor circuit.

The element with which the contact members 16 and 17 associate to normally close the motor circuit is a suspended, vertically adjustable, spring controlled, counterweighted, shiftable circuit breaker normally held in the position shown in Figures 2 and 5, against the action of its spring controlling and counter-weighting means by a thermostatic element to be presently referred to, to bridge and close the motor circuit until released by such element, and when released the spring controlling and counter-weighting means will shift the circuit breaker inwardly away from the contacts 16, 17, thereby opening the motor circuit. The spring controlling and counter-weighting means of the circuit breaker will provide for a quick shift thereof from its engagement with the aforesaid contacts. The circuit breaker is constructed from an upper section 22 which is resilient, an intermediate or contact bridging section 23 which is constructed to provide the counter-weighting means of the circuit breaker, and a lower or latching section 24. The section 22, best shown in Figures 2 and 3, consists of a resilient arm 25 having its upper portion formed with a lengthwise disposed slot 26 and its lower portion provided with a sleeve 27, which projects rearwardly with respect thereto and has formed at its back with a rearwardly extending curved re-setting arm 28.

The section 23 is constructed of a body of non-conducting material, as indicated at 28' and which has a reduced upper portion 29, extending into the sleeve 27 and said reduced upper portion 29 is secured to the section 22 by the hold fast devices 30, 31. The lower end of the section 23 is formed with a clearance 32. The sections 22 and 23 normally tend to swing the circuit breaker clear of the contacts 16, 17.

The section 24 consists of a metallic strap 33 which is secured to the front of the section 23 and depends therefrom. A hold fast device 34 is provided for securing the upper end of the section 24 to the section 23. The clearance 32 is provided for the head of the hold fast device 34. The lower end of the strap 33 is bent rearwardly at right angles as at 35 and then in an upward manner as at 36 to provide what may be termed a nose, and which is adapted to be engaged by a thermostatic element to be hereinafter referred to, for the purpose of maintaining the circuit breaker in engagement with the contact members 16 and 17. The forward face of the section 23 is formed with a contact plate 37, secured in position by the hold fast device 38. The contact plate 37 bridges electrically the contact members 16 and 17, that is to say the space formed between the arms 19 of said members whereby the motor circuit will be closed. When the thermostatic element, to be presently referred to, is in engagement with the nose 36, as shown in Figure 5, the circuit breaker will be forced outwardly so that the contact plate 37 will engage the arms 19 of the contact members and close the circuit and when the thermostatic element, to be presently referred to, is clear of the nose 36, the circuit breaker will automatically swing to the position shown in Figure 3 whereby the contact plate 37 will be moved clear of the arms 19 of the contact members and the motor circuit will then be opened. The motor circuit is automatically opened when the thermostatic element, to be presently referred to, is expanded from excessive heat from the motor or from other causes, and on the expanding action of said thermostatic element it will be caused to clear the nose 36, whereby the circuit breaker will automatically shift to the position shown in Figure 3.

The thermostatic element is referred to generally by the reference character 39 and is formed from a strip of suitable metallic material, of the desired length and width, and is constructed with an upper portion 40, an intermediate portion 41 which is curved and a lower portion 42. The portion 42 is positioned against the top wall of the groove 3 and the portion 41 overlaps the edge of the base 1, at the reduced portion thereof, which is provided by the groove 3, and the portion 40 projects forwardly and in a direction towards the circuit breaker and is spaced above the base 1. See Figure 3.

The circuit breaker is manually set or reset by the operator engaging the arm 28 and shifting the circuit breaker forwardly and the setting of the circuit breaker is in such a manner that the nose 36 will engage the forward edge of the portion 40. The position of the parts when the thermostatic controlling element 39 is in engagement with the nose 36 is as shown in Figure 5. On the expansive action of the thermostatic controlling element 39, it will shift clear of the nose 36, and the circuit breaker will then move to the position shown in Figure 3, whereby the motor circuit will be open.

The thermostatic controlling element 39, can be constructed of any suitable material and can be set up of seventy-five percent of tin and twenty-five percent of lead or from seventy-five to ninety percent of tin and from ten percent to twenty-five percent of lead. It is to be understood however that the thermostatic controlling element can be constructed of any suitable material which will possess the characteristics desired and which is an expansive and contactive action.

When the switch is installed it should be placed on top of the motor on the laminated iron, if not placed on the frame on the top of the motor. Before adjusting the thermostatic element the motor should be run about an hour to let the thermostatic element place itself in the proper position so that the thermostatic element can be set flush with the circuit breaker. When installed on a low temperature motor, the circuit breaker can be set flush with the thermostatic element immediately. When there is a slight temperature caused by anything the thermostatic element will act at once. The circuit breaker can be adjusted vertically and for such purpose a screw 43 is provided which extends through the slot 26 and engages in an upstanding forwardly inclined apertured lug 44, which is carried by the plate 45 secured by the hold fast devices 46 to the top 7 of the member 5. The screw 43 permits of the circuit breaker to be adjusted upwardly or downwardly or in other words slide up and down the inclined lug 44. The switch can be used two ways, as for example voltage release or no voltage release. When the switch is installed there is no danger of gumming up or getting out of order. All nuts and screws are soldered but one and it has a lock nut.

The portion 42 of the thermostatic controlling element 39 is secured to the base 1 by the hold fast device 46.

An open bottom cut-out casing 47 is provided for enclosing the elements of the switch and the base.

The circuit breaker operates through the space formed between the bars 10 and extends into the cut-out portion 2. The circuit breaker normally extends at a rearward inclination with respect to the bars 10, and is shifted forwardly to position the same to be engaged by the forward edge of the portion 40 of the thermostatic element to hold the contact plate in engagement with the contact members to close the motor circuit.

Excessive temperature is also caused by partial openings in the line of motor, overloading of the motor and low frequency. The switch will act automatically when excessive temperature is had, or in other words a temperature sufficient to provide for the expansion of the thermostatic element 39 whereby the same will shift clear of the nose 36 and release the circuit breaker.

It is thought that the many advantages of a thermostatic switch, in accordance with this invention, and for the purpose referred to, can be readily understood, and although the preferred embodiment of the invention is as illustrated and described, yet it is to be understood that changes in the details of construction can be had which will fall within the scope of the invention as claimed.

What I claim is:

1. A thermostatic safety switch for electrical motors comprising a pair of contacts adapted to be positioned in the motor circuit, said contacts arranged in spaced relation, a resiliently suspended circuit breaker positioned rearwardly of and having circuit closing means normally clear of said contacts and adapted when the breaker is shifted forwardly to abut said contacts to close the motor circuit, and a thermostatic controlling element for engagement with the lower end of said breaker when shifted forwardly to hold it in engagement with said contacts thereby providing for the closing of the motor circuit, said element on the expansion thereof automatically shifting clear of the breaker to release the same whereby the latter will automatically move rearwardly to open the motor circuit.

2. A thermostatic safety switch for electrical motors comprising a pair of contacts adapted to be positioned in the motor circuit, said contacts arranged in spaced relation, a resiliently suspended circuit breaker positioned rearwardly of and having circuit closing means normally clear of said contacts adapted when the breaker is shifted forwardly to abut said contacts to close the motor circuit, a thermostatic controlling element for engagement with the lower end of said breaker when shifted forwardly to hold it in engagement with said contacts thereby providing for the closing of the motor circuit, said element on the expansion thereof automatically shifting clear of the breaker to release the same whereby the latter will automatically move rearwardly to open the motor circuit, and a re-setting arm for said breaker.

3. In a thermostatic safety switch for electrical motors a pair of spaced contacts adapted to be positioned in the motor circuit, a downwardly extending and normally rearwardly inclined circuit breaker provided with means normally clear of said contacts for closing the motor circuit when said breaker is shifted from normal position, said breaker being resiliently suspended, a thermostatic controlling element for normal engagement with said breaker when shifted in a direction towards and holding it in engagement with said contacts whereby the means carried by said breaker will close the motor circuit, the said thermostatic controlling element adapted on expansion thereof to automatically clear said breaker thereby permitting the latter to swing automatically to normal position and open the motor circuit, said contacts extending downwardly and forwardly at an inclination, and said breaker having as a part thereof spring controlling and counter-weighting means.

4. In a thermostatic safety switch for electrical motors, a pair of spaced contacts adapted to be positioned in the motor circuit, a downwardly extending and normally rearwardly inclined circuit breaker provided with means normally clear of said contacts for closing the motor circuit when said breaker is shifted from normal position, said breaker being resiliently suspended, a thermostatic controlling element for normal engagement with said breaker when shifted in a direction towards and holding it in engagement with said contacts whereby the means carried by said breaker will close the motor circuit, the said thermostatic controlling element adapted on expansion thereof to automatically clear said breaker thereby permitting the latter to swing automatically to normal position and open the motor circuit, a resetting arm carried by said breaker for manually re-setting the same, said contacts extending downwardly and forwardly at an inclination, and said breaker having as a part thereof spring controlling and counter-weighting means for normally maintaining it clear of the contacts.

5. A thermostatic safety switch for electrical motors a pair of contacts adapted to be positioned in the motor circuit, said contacts arranged in spaced relation, a resilient circuit breaker having circuit closing means normally clear of said contacts and adapted when shifted from normal position to abut said contacts to close the motor circuit, a thermostatic controlling element for normal engagement with said breaker when shifted in a direction from its normal position, thereby providing for the closing of the motor circuit and adapted on the expansion thereof to automatically shift clear of the breaker to release the same whereby the latter will automatically move to normal position and open the motor circuit, and means to provide for the vertical adjustment of said breaker.

6. In a thermostatic safety switch for electrical motors, a pair of spaced contacts adapted to be positioned in the motor circuit, a downwardly extending and normally rearwardly inclined circuit breaker provided with means normally clear of said contacts for closing the motor circuit when said breaker is shifted from normal position, said breaker being resiliently supported, a thermostatic controlling element for normal engagement with said breaker when shifted in a direction towards and holding it in engagement with said contacts whereby the means carried by said breaker will close the motor circuit, the said thermostatic controlling element adapted on expansion thereof to automatically clear said breaker, thereby permitting the latter to swing automatically to normal position and open the motor circuit, and means to provide for the vertical adjustment of said breaker.

7. In a thermostatic safety switch for electrical motors a pair of spaced contacts adapted to be positioned in the motor circuit, a downwardly extending and normally rearwardly inclined circuit breaker provided with means normally clear of said contacts for closing the motor circuit when said breaker is shifted from normal position, said breaker being resiliently suspended, a thermostatic controlling element for normal engagement with said breaker when shifted in a direction towards and holding it in engagement with said contacts whereby the means carried by said breaker will close the motor circuit, the said thermostatic controlling element adapted on expansion thereof to automatically clear said breaker thereby permitting the latter to swing automatically to normal position and open the motor circuit, said contacts extending downwardly and forwardly at an inclination, said breaker having as a part thereof spring controlling and counter-weighting means, and means to provide for the vertical adjustment of said breaker.

8. In a thermostatic safety switch for electrical motors, a pair of spaced contacts adapted to be positioned in the motor circuit, a resiliently suspended, shiftable circuit breaker provided intermediate its ends with means normally clear of and engaging said contacts for closing the motor circuit when said breaker is shifted from normal position, said breaker further provided at its lower end with a nose, and a thermostatic controlling element for engagement with the nose of said breaker when the latter is shifted in a direction towards said contacts for holding said means in engagement with the contacts to close the motor circuit, said element possessing a characteristic on the application of excessive temperature thereto to automatically clear said nose to provide for the release of the breaker thereby opening the motor circuit.

9. In a thermostatic safety switch for electrical motors, a pair of spaced contacts adapted to be positioned in the motor circuit, a resiliently suspended, shiftable circuit breaker provided intermediate its ends with means normally clear of and engaging said contacts for closing the motor circuit when said breaker is shifted from normal position, said breaker further provided at its lower end with a nose, a thermostatic controlling element for engagement with the nose of said breaker when the latter is shifted in a direction towards said contacts for holding said means in engagement with the contacts to close the motor circuit, said element possessing a characteristic on the application of excessive temperature thereto to automatically clear said nose to provide for the release of the breaker thereby opening the motor circuit, and a manually operated resetting arm for said breaker.

10. In a safety switch for motors, a pair of spaced, vertically disposed contacts adapted to be positioned in the motor circuit, a resiliently suspended, vertically adjustable, spring controlled, counter-weighted shiftable circuit breaker normally clear of said contacts and including means when the breaker is shifted in one direction to bridge said contacts to close the motor circuit, said breaker automatically shiftable to circuit opening position and held in circuit closing position against the action of the spring controlling and counter-weighting means thereof, and an expansible thermostatic element associated with said breaker for controlling the circuit closing and opening position of said means with respect to said contacts, said element normally abutting against said breaker for maintaining said means in circuit-closing position with respect to said contacts, and said element when expanded clearing said breaker to permit of the automatic shifting of the latter to circuit-breaking position.

In testimony whereof, I affix my signature hereto.

PETER STRUGHOLD.